(12) United States Patent
Strietzel et al.

(10) Patent No.: US 7,536,915 B2
(45) Date of Patent: May 26, 2009

(54) DIAPHRAGM VACUUM MEASURING CELL AND METHOD FOR THE PRODUCTION OF SUCH MEASURING CELL

(75) Inventors: Carsten Strietzel, Osterreich (AT); Per Björkman, Aland (FI); Walter Berner, Schweiz (CH)

(73) Assignee: Inficon GmbH, Bad Ragaz (CH)

( * ) Notice: Subject to any disclaimer, the term of this patent is extended or adjusted under 35 U.S.C. 154(b) by 0 days.

(21) Appl. No.: 11/935,874

(22) Filed: Nov. 6, 2007

(65) Prior Publication Data
US 2008/0110269 A1   May 15, 2008

(30) Foreign Application Priority Data
Nov. 13, 2006   (CH) ..................... 1817/06

(51) Int. Cl.
*G01L 9/12* (2006.01)
(52) U.S. Cl. ............... 73/718; 73/714; 73/724
(58) Field of Classification Search ......... 73/714, 73/718, 724
See application file for complete search history.

(56) References Cited

U.S. PATENT DOCUMENTS

| | | | | |
|---|---|---|---|---|
| 5,889,211 | A * | 3/1999 | Maudie et al. | 73/720 |
| 5,945,605 | A * | 8/1999 | Julian et al. | 73/727 |
| 6,591,687 | B1 * | 7/2003 | Bjoerkman et al. | 73/724 |
| 6,619,131 | B2 * | 9/2003 | Walchli et al. | 73/718 |
| 7,140,085 | B2 * | 11/2006 | Bjoerkman et al. | 29/25.42 |
| 7,305,888 | B2 * | 12/2007 | Walchli et al. | 73/714 |
| 2004/0012942 | A1 | 1/2004 | Bjoerkman | |
| 2005/0034527 | A1 * | 2/2005 | Aizawa | 73/718 |

(Continued)

FOREIGN PATENT DOCUMENTS

EP   0 736 757   10/1996

OTHER PUBLICATIONS

Hoivik, et al. "Atomic layer deposited protective coatings for microelectromechanical systems", Sensors and Actuators A, Elsevier Sequoia S.A., Lausane, CH Bd 103, Jan. 15, 2003.

*Primary Examiner*—Lisa M Caputo
*Assistant Examiner*—Freddie Kirkland, III
(74) *Attorney, Agent, or Firm*—Notaro & Michalos P.C.

(57) ABSTRACT

Introduced is a method for the production of a diaphragm vacuum measuring cell, wherein on the one side of the diaphragm (2) at a spacing a first housing plate (1) is disposed sealing in the margin region with a joining means (3), and that on the other side of the diaphragm (2) at a spacing a second housing plate (4) is disposed sealing in the margin region with a joining means (3), and that the second housing plate (4) has an opening at which a connection means (5) is disposed sealing with joining means (3) for the connection of the measuring cell (8) with the medium to be measured, wherein the diaphragm (2) and the two housing plates (1, 4) are comprised of a metal oxide. Using an ALD method, the measuring cell is coated in a vacuum chamber (64), in particular through the opening of the measuring cell, such that the inner wall of the measuring vacuum chamber (9) and the opening with the connection means (5) is covered with a protective layer (13) such that at least the joining means (3) for the diaphragm (2) is protectively covered against corrosion.

23 Claims, 2 Drawing Sheets

U.S. PATENT DOCUMENTS

2006/0053893 A1* 3/2006 Banholzer et al. ............. 73/715
2007/0089524 A1* 4/2007 Walchli et al. ................ 73/718
2007/0120568 A1* 5/2007 Bjorkman et al. ........... 324/460
2008/0110008 A1* 5/2008 Walchli et al. ........... 29/407.08

* cited by examiner

DIAPHRAGM VACUUM MEASURING CELL AND METHOD FOR THE PRODUCTION OF SUCH MEASURING CELL

FIELD AND BACKGROUND OF THE INVENTION

The invention relates to a method for the production of a vacuum measuring cell with a diaphragm according to the preamble of patent claim 1 as well as to such a measuring cell according to the preamble of patent claim 18.

It is known to measure pressures or pressure differences by pressurizing a thin diaphragm and measuring its deflection. A known and suitable method for measuring the deflection of such diaphragm comprises implementing the diaphragm arrangement as a variable electric capacitor, wherein via measuring electronic circuitry in known manner the capacitance change, which correlates with the pressure change, is evaluated. The capacitor is implemented by disposing the thin flexible diaphragm surface at a short distance opposite a further surface and coating both opposing surfaces with an electrically conducting coating or implementing them of electrically conductive material. Due to the deflection, the distance between the two electrodes changes upon pressurization of the diaphragm leading to a capacitance change of the arrangement which can be evaluated. Sensors of this type are produced of silicon in large production numbers. The areal base body as well as also the diaphragm are herein often entirely comprised of silicon material. There are also designs with combined material composition, for example silicon with glass base. The sensors can thereby be produced cost-effectively. As a rule, pressure sensors of this type are only applicable for higher pressure ranges in the range of approximately $10^{-1}$ mbar to a few bar. High resolution at lower pressures from approximately $10^{-1}$ mbar on, are no longer realizable with the material silicon. Sensors of this type are not suitable for typical vacuum applications. The reason is inter alia that the silicon reacts on the surface with the environment and the sensitive sensor characteristic is thus disturbed. Water vapor contained in normal atmospheric air already leads to corresponding reactions on the surfaces. The problem is additionally exacerbated if the sensor is employed in chemically aggressive atmospheres, which in current reactive vacuum plasma processes is increasingly common. Attempts have therefore been made to protect such silicon sensors by passivating the surfaces against aggressive external actions. Attempts have also been made to provide the surface with a protective coating in order to increase the durability and resistance against the chemically aggressive environment, as has been described in DE 41 36 987. Such measures are difficult to realize and, in the case of mechanically deformable parts, such as diaphragms, only yield limited success, in particular with especially aggressive media, such as fluorine, bromic acid and their compounds, such as are utilized in the semiconductor industry, for example in vacuum etching methods.

It has therefore been proposed to produce measuring cells for vacuum pressure measurement of corrosion-resistant materials such as $Al_2O_3$. EP 1 070 239 B1 describes a capacitive vacuum measuring cell which is substantially completely built of ceramic and, consequently, is to a high degree corrosion-resistant. To be able to measure very low pressures up to $10^{-6}$ mbar with high accuracy, a very thin ceramic diaphragm of <250 µm thickness is utilized, which is disposed tension-free and symmetrically in a ceramic housing. Although this diaphragm-based vacuum measuring cell is very successful and represents a substantial advance with respect to corrosion resistance, it was found that the joining regions between diaphragm and housing, as well as the joining region for the connecting piece and, if applicable, the connecting piece itself, when used in aggressive process environments, which contain for example acids, halogens, such as chlorine and fluorine, etc., represent a weak spot regarding the service life of the cell even if the entire cell is substantially comprised of a corrosion-resistant ceramic. In the assembled state the measuring cell includes extremely small voids exposed to the process gases, which voids are offset in the form of a labyrinth and accessibility to the regions where the joining sites of the parts are located entails significant difficulty. Coverage of such regions in such small and difficult to access voids through suitable coating also appears scarcely possible, especially since during the coating the particles would have to be guided around the edges and corners of this labyrinth.

SUMMARY OF THE INVENTION

The invention consequently addresses the problem of eliminating the disadvantages of prior art. The invention in particular addresses the problem of further improving the corrosion resistance of ceramic vacuum measuring cells with diaphragms, especially against acid-containing and/or halogen-containing aggressive vacuum processes, such as are employed in particular in semiconductor production. The measuring cell should, in addition, be economically producible.

The problem is solved in the vacuum measuring cell according to the genus according to the characterizing features of patent claims 1 and 18. The dependent patent claims refer to advantageous further embodiments of the invention.

The capacitive vacuum measuring cell according to the invention is produced entirely of a ceramic, such as in particular $Al_2O_3$, and/or at least parts thereof of sapphire. Thereby very high corrosion resistance and long-lasting reproducibility are attained. Only in regions, in which sealing and joining is necessary or where leadthroughs or measuring connections are provided, materials other than $Al_2O_3$ are provided in small quantities unless the $Al_2O_3$ is welded without foreign material addition. The cell comprises a first plate-shaped housing body across which a diaphragm is disposed sealed in the margin region such that it encloses a reference vacuum chamber. On the side facing away from the reference vacuum chamber, also closed in the margin region under sealing, a second housing body is disposed at a spacing such that here a measuring vacuum chamber is formed. This measuring vacuum chamber is provided with a connection for the inlet of the medium to be measured.

In the implementation as a capacitive measuring cell arrangement the surfaces of the first housing body and of the diaphragm, which form the reference vacuum chamber, are coated to be electrically conducting, for example with gold, and thereby form the electrodes of the capacitance measuring cell. The electrodes, in turn, are carried out, for example through the first housing body or through the sealing region in the margin zone. The electrode faces disposed substantially parallel have a distance from one another in the range from 2 µm to 50 µm. The diaphragm is preferably sealed in the margin regions against the two houses by welding, for example, by laser welding. However, highly suitable and simple in application is also a glass solder, which is also corrosion-resistant. A further feasibility for a sealing joining also comprises diffusively joining housing parts, for example in the green body stage if the critical issue is avoiding $Al_2O_3$-foreign material completely. Such a capacitive measuring cell arrangement is described in EP 1 070 239 B1, which text description forms integral part of the present application.

In the implementation of an optically readable measuring cell, instead of the capacitive arrangement, light, preferably laser light, is coupled in via a window on the housing body 5 and here reflected back, such that a Fabry-Perot arrangement is formed and the deflection of the diaphragm is measured with the aid of an interference spectrometer. Such an optical measuring cell arrangement is described in U.S. Ser. No. 11/497,226, which text description forms integral part of the present application. The window with advantage is here formed of sapphire or the housing body itself can be formed of sapphire. Under very high requirements the diaphragm itself can also be formed of sapphire. The use of sapphire permits a further increase of the corrosion resistance.

In the assembled state the diaphragm measuring cell is according to the invention within the measuring vacuum chamber coated with a corrosion-resistant metal oxide using the ALD method through the opening of the measuring connection of the measuring cell. The inner wall of the measuring vacuum chamber, thus the diaphragm and the housing body, as well as the opening region with the connection means is thereby covered with a protective layer. At least the joining region between diaphragm and housing body should be covered. However, preferably the joining region of the connection means for the measuring connection should simultaneously also be covered. If the measuring connection itself is comprised of a not highly corrosion-resistant material, such as a metal, the feed bore should also be covered adequately in that the ALD coating takes place directly through this opening and becomes effective on its walls also.

ALD is the abbreviation of tomic Layer Deposition and is defined as follows: The atomic layer deposition (ALD) is a technique of coating out of the gas phase in which the gaseous reactants are conducted into a vacuum chamber. The essential difference between ALD and CVD (Chemical Vapor Deposition) is that the layer growth in ALD takes place cyclically by means of self-saturating surface reactions. Thereby essentially one atomic layer after the other is generated and the layer is built up. This property is attained through the suitable selection of the process conditions, in particular of the reactants.

A growth cycle normally comprises four steps:

1. Introduction of the first precursor (for example TMA)

2. Evacuation, purging of the reaction chamber (for example $N_2$)

3. Introduction of the second precursor (for example $H_2O$)

4. Evacuation, purging of the reaction chamber (for example $N_2$)

This cycle is repeated until the desired film thickness has bee reached. Depending on the method and the reactor, a cycle lasts between 0.5 and a few seconds, wherein per cycle 0.1 to 3 Å (Angstrom) of film material are generated. (For example, in a highly suitable arrangement 0.95 D per cycle was generated and measured for $Al_2O_3$).

In favorable cases each action step runs to completion, i.e., the precursor molecules chemisorb or react with the surface groups until the surface is as much as possible completely coated. Subsequently no further adsorption takes place. Under these reaction conditions, layer growth is self-controlling, i.e. the quantity of the layer material deposited in each reaction cycle is constant. The layer thickness only depends on the number of reaction cycles, which permits exact and simple control. This definition and terminology refers to U.S. Pat. No. 4,058,430 by T. Suntola and to Mikko Ritala, Atomic Layer Deposition, *Fundamental and Technological Aspects of High-k Gate Dielectrics*, Ed. M. Houssa, Institute of Physics Publishing, Bristol (2004), p. 17.

With the aid of this ALD coating it becomes possible to protect additionally the corrosion-weaker joining sites, such as a glass solder or material, changed welding sites or also additional structural parts of less corrosion-resistant materials, even if these are located in regions of the voids of the cell difficult of access. The ALD method permits reliably effectuating the controlled deposition in extremely small voids even around labyrinth-like structures.

The various features of novelty which characterize the invention are pointed out with particularity in the claims annexed to and forming a part of this disclosure and are entirely based on the Switzerland priority application no. 01817/06, filed Nov. 13, 2006.

BRIEF DESCRIPTION OF THE DRAWINGS

In the following the invention will be described schematically and by example with reference to Figures. Therein depict.

Figure 1:
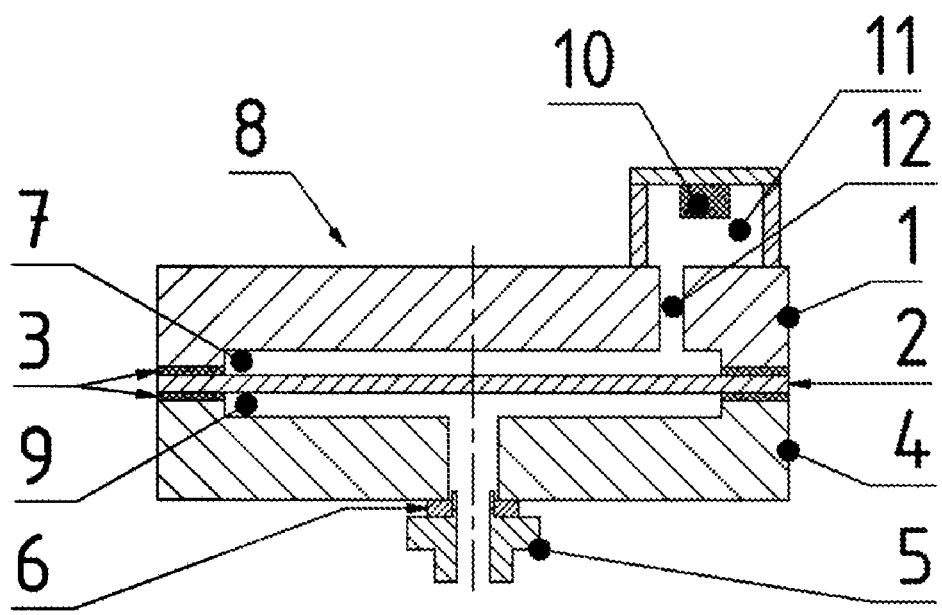
FIG. 1 schematically and in cross section a capacitive diaphragm vacuum measuring cell of ceramic, FIG. 2 schematically and in cross section a vacuum measuring cell according to FIG. 1 with a protective coating according to the invention, FIG. 3 schematically a reactor arrangement for carrying out the vacuum coating method according to the invention.

A known capacitive measuring cell 8 of $Al_2O_3$ with a structure substantially entirely built symmetrically around the diaphragm is shown in cross section in FIG. 1. The first housing body 1 is comprised of a ceramic plate, preferably of $Al_2O_3$, which is joined at a distance of 2 µm to 50 µm opposite the ceramic diaphragm 2 forming a seal in the margin region and encloses a reference vacuum chamber 7. The distance between the two faces, as a rule, is set directly during the mounting via the sealing material 3 which is located between the diaphragm margin and the housing margin. In this way a completely planar housing plate 1 can be utilized. In the same manner, with a second housing body 4 on the opposite diaphragm side a measuring vacuum chamber 9 is formed, which can be reached by the media to be measured via connection means 5 through an opening in the second housing body 4. The connection means can be implemented as a connecting piece with a connection line or as a tube and is connected with joining means 6 with the second housing body 4 under sealing. These can be comprised of a suitable metal, such as Vacon, or preferably also of a corrosion-resistant ceramic as the measuring cell 8 with the two housing bodies 1, 4 and the diaphragm 2.

The thickness of the sealing means 3 on both sides of the diaphragm 2, as stated, determines the distance of the two housing bodies 1, 4. However, it is additionally feasible to implement steps on the housing body 1, 4 in the region of the sealing means 3, in order to establish the distance additionally together with the sealing means 3. The sealing means 3 is, for example and preferably, comprised of a glass solder which is simple to handle and can be applied, for example, through screen printing. In a typical measuring cell having an outer diameter of 38 mm and a free inner diaphragm diameter of 30 mm, the distance 3 is approximately 2 to 50 µm, preferably 12 to 35 µm. The first housing body 1 is herein, for example, 5 mm thick, the second housing body 4, 3 mm thick. The second housing body 4 is preferably provided in the interior region with an approximately 0.5 mm deep recess to form a step in order to enlarge the measuring vacuum chamber 9. Diaphragm 2 and housing 1 are each coated with an electrically conducting layer on the reference vacuum chamber side, for example, for the formation of a capacitive measuring cell 8. The two layers are not electrically connected with one another and thereby form a capacitor arrangement. The layers may, for example, be painted, printed, sprayed on or be applied using a vacuum method. They are preferably applied with a vacuum method, such as vapor deposition or sputtering. Gold is especially suitable as the layer material which is vapor-deposited, for example, at a layer thickness of 1 μm, and subsequently is thinned, for example, by means of sputter etching to a few nanometers, for example 5 nm. The layer thickness can thereby be defined and be adjusted to sufficient thickness and tension-free. The electric connections of the conducting layers preferably takes place with vacuum-tight, electrically conducting leadthroughs, preferably through the housing body 1, where they can subsequently be connected to the electronic evaluation circuitry.

To be able to maintain a reference vacuum in chamber 7 which is stable over the long term, a getter 10 is provided. This getter is preferably a non-vaporizable getter in order to keep the reference vacuum chamber 7 free of vaporizing particles. On the first housing body 1 a getter chamber 11 is attached to contain the getter 10, which is connected with the reference vacuum chamber 7 via a connection line 12 or pumping line. The getter chamber 11 can also be set onto the housing body 1, however, it is advantageously set into the housing 1. When the reference vacuum chamber 7 is pumped down via the pumping line 12, the getter chamber 11 is connected with a pumping device. While being pumped down, the getter 10 is heated, such that the getter is activated and simultaneously degassed. After activation of getter 10, the getter chamber 11 is closed under sealing on the housing during the pumping-down.

Structured similarly is also an optically readable diaphragm measuring cell 8. In this case no capacitor coatings are required. On the first housing body 1 in the central region an optically transparent window is disposed via which, preferably with optical fiber, light, preferably laser light, is coupled in and conducted to the diaphragm surface. The latter is coated with a reflecting coating to reflect back the light. On the housing window additionally a partially reflecting mirror may be disposed. This configuration permits interferometric evaluation of the diaphragm deflection with the aid of a Fabry-Perot interferometer. The optical window is preferably comprised of sapphire and is set into the first housing body 1 and here connected vacuum-tight with sealing means 3, such as with a glass solder. However, the first housing body 1 can also be produced entirely of sapphire. The diaphragm measuring cells, in particular the two housing bodies and the diaphragm, are implemented of a metal oxide or a ceramic in order to attain high corrosion resistance. Preferably used is herein an aluminum oxide ($Al_2O_3$). The alpha modification of the aluminum oxide is preferred. Highly especially preferred is the aluminum oxide sapphire modification. Different metal oxides can be utilized in combination. For example, a conventional aluminum oxide for the first housing body 1 can be combined with a sapphire window. Or, the diaphragm 2 can also be of sapphire and the housing bodies can be comprised of simpler modifications of aluminum oxide or of other metal oxides. Implementation of the diaphragm 2 of sapphire has special advantages with respect to thermal behavior and greater elasticity is attained. Greater deflections can thereby be permitted whereby the measuring range is expanded. Suitable ceramic materials are also zirconium oxide ($ZrO_2$) and/or silicon nitride ($Si_3N_4$). Further ceramic materials still suitable are titanium oxide ($TiO_2$) and/or silicon carbide (SiC). Combinations of these materials within a measuring cell structure are feasible. However, materials within the same substance group are preferred, thus, for example, the combination of different $Al_2O_3$ forms, such as aluminum oxide and sapphire. The connection means 5 themselves are advantageously also fabricated of such materials.

The joining means 3, 6 like those of the housing bodies 1, 4 with the diaphragm 2, of the connection means 5 with the second housing body 4 and of the getter chamber 11 with the first housing body 1 are established, for example, with a glass solder or also with an active solder such as, for example, TiCuAg if, for example, ceramic materials are to be connected with metallic materials. Other feasibilities, such as laser welding, friction welding and diffusion welding are possible, or combinations thereof, at the various connection sites in the measuring cell.

Figure 2:
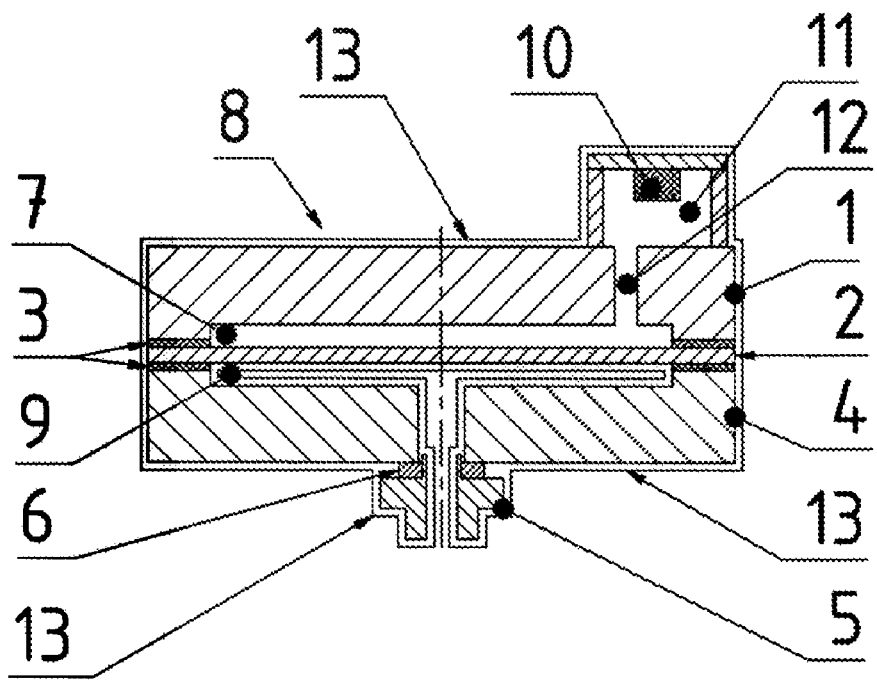
Figure 3:
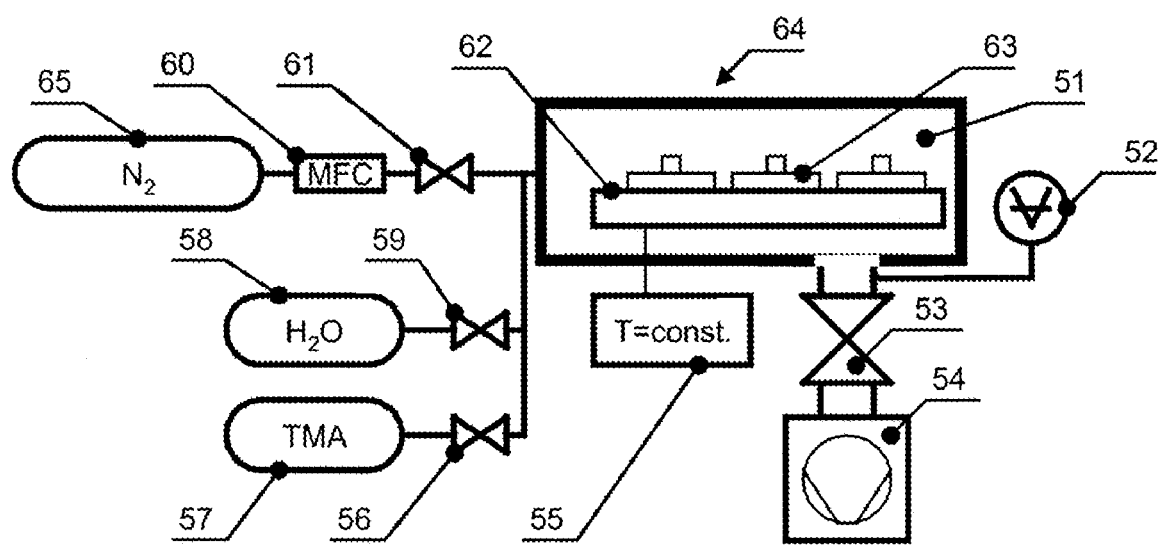

It has been found that the joining sites with the joining means 3, 6 which are exposed to the process environment to be measured, determine and restrict the corrosion resistance and therewith the service life of the measuring cell 8, although, for example, a glass solder per se has good properties in this regard. It has been found that with the aid of a suitable protective layer 13, which covers at least these sensitive joining regions, as is shown schematically in FIG. 2, the service life of the measuring cell 8 can be significantly extended. In addition, it becomes therewith also possible to cover protectively other less corrosion-resistant materials and thereby to utilize them nevertheless, such as for example in the connection region of the cell. This permits a greater degree of structural freedom and better adaptation to the application conditions. However, for this purpose a suitable coating method had to be realized, which makes possible depositing corrosion-resistant layers 13 well and economically and to do this within the small cavities of the completely assembled measuring cell 8 through the small measuring openings over edges, corners and steps, which in the conventional known coating methods entails difficulties. The layer itself must, in addition, be of sufficient neutrality and must not impermissibly falsify the measurement with the measuring cell 8. The coating itself, for example, must not generate impermissible contaminations or even distortions of the diaphragm 2.

The deposition of such a protective layer 13 is made possible according to the invention through an ALD coating method, as is described in the following using a preferred example of the deposition of a preferred protective layer 13 for $Al_2O_3$: Substrates 63, thus assembled measuring cells 8 (approximately 10-20 pieces), are introduced into a vacuum chamber 64 having a volume 51 of approximately 15 liters. This chamber includes a substrate holder 62 with a heating mechanism onto which the substrates 63 are placed such that such substrates are exposed.

After the vacuum chamber is closed, it is evacuated by means of a vacuum pump 54 to a final pressure of less than $10^{-1}$ mbar for approximately one hour. As is conventional, apart from the vacuum pump 54, the pump arrangement comprises a vacuum valve 53 and a vacuum measuring cell 52 for checking the vacuum conditions. This time period serves for the desorption of gases from the surface of the substrate and the heating and stabilization of the substrate heater with the substrates. For the coating with $Al_2O_3$ a substrate temperature of 250° C. is selected with the aid of the temperature regulation means 55.

Following this preparation time, the coating process is started in cycles. One coating cycle is defined by the following four process steps:

1. Introduction of the first precursor 57 (TMA; pulse time: 0.1-0.2 seconds);

2. Purging of reaction chamber with purge gas 65->$N_2$ at 2-4 seconds duration;

3. Introduction of the second precursor 58 ($H_2O$; pulse time: 0.1-0.2 seconds)

4. Purging of reaction chamber with purge gas 65->$N_2$ at 2-4 seconds durations.

Both precursors are vaporized at ambient temperature from the precursor sources 57 and 58, since the vapor pressures in the selected structure are sufficiently large for fast coverage of the surfaces. The precursors are introduced pulse-like into the process volume. For this purpose the pulse valves 56 and 59 are opened for a period of 0.1-0.2 seconds. The purge gas 65, which is, for example, nitrogen, is provided from a purge gas source 65 via a purge gas valve 61. By means of varying the purge gas flow by means of a flow regulator 60 during the coating cycles a process pressure of approximately 1 mbar is set in order to ensure sufficient flow of the precursors over the substrate surface, on the one hand, and good purging between the process steps, on the other hand. For checking and regulating the process pressure, a vacuum measuring cell 52 is utilized.

Herein, for example, 0.95 Å layer growth results for $Al_2O_3$ per cycle. Therewith approximately 1050 cycles, for example, are necessary in order to generate a layer growth of 100 nm.

The first and the further precursor 58, 57, as well as the purge gas 65 are consequently sequentially introduced into the vacuum chamber 64 with valves 56, 59, 61 operated under control and pulsed, according to predetermined intervals and the purge gas 65 is preferably introduced via a gas flow regulator 60. The process can be fully automated using a process control and long processes with a large number of cycles can thereby be worked through economically. In addition to the use of only two precursors, several precursors can also be utilized when required and even a profile with variation of different material compositions can also be attained.

Preferred first precursors 57 are listed in Table 1:

TABLE 1

| Layer Material | Precursor |
|---|---|
| $TiO_2$ | Titanium chlorides (not preferred); titanium tert-butoxides |
| $^I Al_2O_3$ | $^I$Trimethyl aluminum (TMA) |
| $Ta_2O_5$ | Tantalum ethoxides |

The second precursor 58 is an oxidizing agent, preferably water ($H_2O$). As the purge gas an inert gas is utilized, such as a rare gas, such as for example argon, or preferably nitrogen.

TMA (Trimethyl aluminum) is here a preferred example of a precursor for the deposition of $Al_2O_3$. This starting product is also denoted here in German as process gas (Engl. Precursor), although some starting products ($H_2O$) are liquid. However, for precursor here the English term recursor is also used with the following definition (Air Liquide): recursors are fluid chemicals which are utilized in new CVD processes with small structure width (<90 nm) as coating material.

For the protective layer deposition using ALD in the diaphragm vacuum measuring cell the following setting parameter ranges are especially suitable:

| | |
|---|---|
| Substrate temperature: | 100° to 500° C., preferably 200° to 400° for $Al_2O_3$, >200° C., preferably >250° C. |
| Carrier gas: | preferably $N_2$; also rare gas such as Ar possible |
| Working pressure chamber: | 1-10 mbar |
| Layer thickness per cycle: | appr. 0.5 to 3.0 Å, preferably 1.0 (0.1 nm) |
| Number of cycles | a few hundred to a few thousand (200 to 5000), for 100 nm $Al_2O_3$, for example, 900 to 1200 cycles |
| Protective layer: | layer thickness 20-200 nm, preferably 25-50 nm |
| Layer thickness variation: | preferably less than 5% |

The protective layer material is preferably $Al_2O_3$. Further feasible is $Ta_2O_5$, at most also $TiO_2$.

The attained layer quality is defined and demonstrated on the basis of a simple chemical etching test. The layer is exposed for 10 minutes at ambient temperature to HCl in a concentration of 32%. Therewith realistic conditions, such as are in practice simulated in corrosive semiconductor processes with chlorine chemistry, where the measuring cells are employed, however, here in accelerated form.

The protective layer 13 is deposited onto a lead glass substrate as a trial sample with the method according to the present invention. The lead glass substrate corresponds to the glass solder 3 with a correspondingly utilized effective thickness of approximately 20 μm. The substrate, as described above, is subsequently exposed to HCl and subsequently the mean number of layer corrosion holes per square millimeter is determined.

The results are compiled in the following Table 2:

TABLE 2

| | Layer Thickness: | | | |
|---|---|---|---|---|
| | 25 nm | 50 nm | 100 nm | 200 nm |
| Number of Holes: | 63 | 5.7 | 1.7 | 0.7 |
| Service Life: appr. x: | 10 | 100 | 300 | |

The uncoated lead glass substrate, thus without corresponding protective layer, is dissolved under said conditions, thus, it is not even available any longer. This corresponds in enhanced form to the dissolution process when the measuring cell is, in fact, exposed to a corrosive process with said chlorine chemistry. Table 2 shows that already with a coating having a thickness of 25 nm $Al_2O_3$ the number of extremely small corrosion holes is only 63, which corresponds to a service life extension of the glass solder 3, and consequently of the measuring cell 8, approximately by the factor 10. At a layer thickness of 50 nm the extension of the service life is already approximately hundred-fold.

The favorable thickness of the protective layer 13 of a metal oxide is within the range between 20 to 200 nm, preferably within 25 to 50 nm, where the action and the economy of the effect is especially favorable. These layer thickness ranges are also especially suitable for $Al_2O_3$ as protective layer material. The coating should consequently be carried out such that the extension of the service life, compared to an uncoated measuring cell, is at least greater by the factor 3, preferably at least by the factor 5 to 20.

In summary, with the proposed ALD coating method the following advantages can be attained:

uniform distribution of the layer thickness for the protective layer, high density of the layer material and consequently high impermeability, good tep coverage thus good coating around steps and edges, good quality of the interface between substrate and layer, good adhesion, and low substrate temperatures are possible, in particular for $Al_2O_3$.

The invention claimed is:

1. Method for the production of a vacuum measuring cell with a diaphragm (2) as pressure transducer, wherein on the one side of the diaphragm (2) at a spacing a first housing plate (1) is disposed sealing in the margin region with a joining means (3), such that between them a reference vacuum chamber (7) is formed and that on the other side of the diaphragm (2) at a spacing a second housing plate (4) is disposed sealing in the margin region with a joining means (3), such that between them a measuring vacuum chamber (9) is formed, and that the second housing plate (4) includes an opening and connection means (5) communicating with the opening and the measuring vacuum chamber (9) disposed sealing with joining means (3) for the connection of the measuring vacuum chamber (9) with the medium to be measured, wherein the diaphragm (2) and the housing plates (1, 4) are comprised of a metal oxide, characterized in that the measuring cell is coated in a vacuum chamber (64) using an ALD method and the material deposition takes place through the opening of the measuring cell and the connection means (5) such that the inner wall of the measuring vacuum chamber (9) and the opening with the connection means (5) are covered with a protective layer (13) such that at least the joining means (3) for the diaphragm (2) is protectively covered, at least one diaphragm measuring cell (8) being placed as a substrate (63) in the vacuum chamber (64) on a substrate holder (62) which includes a heating arrangement, and subsequently the vacuum chamber (64) is evacuated with a pump system (52, 53, 54) and that, after the evacuation is completed to a desired pressure, the coating process takes place in that at least two precursor gases (57, 58) are sequentially introduced into the vacuum chamber (64) at predetermined time intervals wherein between each of these steps the chamber is purged with an inert purge gas (65) for a predetermined time and that this cycle is repeated several times such that from individual chemically reacted atomic coats a metal oxide layer (13) with desired total thickness is deposited.

2. Method as claimed in claim 1, characterized in that as the metal oxide one of the aluminum oxides is utilized or at least the sapphire form is partially utilized.

3. Method as claimed in claim 1, characterized in that at least for one of the joining means (3, 6) a glass solder is utilized.

4. Method as claimed in claim 1, characterized in that at least one of the joining means (3, 6) is established through friction welding.

5. Method as claimed in claim 1, characterized in that the connection means (5) is formed of a metal or a ceramic tubularly or as a connecting piece with a feed line, and that the connection means is connected with the second housing plate with a joining means (6) through a glass solder or friction welding.

6. Method as claimed in claim 5, characterized in that, simultaneously with the joining means (3, 6), the inner wall of the feed line of the connection means, is covered forming a protection.

7. Method as claimed in claim 1, characterized in that the coating takes place with several hundred to a few thousand cycles.

8. Method as claimed in claim 1, characterized in that at least a first precursor (57) is utilized which comprises a metal compound and that at least as a second, or further, precursor (58) an oxygen-containing substance, preferably is utilized.

9. Method as claimed in claim 8, characterized in that the at least first precursor (57) contains the substance titanium chlorides or titanium tert-butoxides for the formation of a $TiO_2$ layer, or that the at least first precursor (57) comprises tantalum ethoxides for the formation of a $Ta_2O_5$ layer.

10. Method as claimed in claim 8, characterized in that the at least first precursor (57) comprises trimethyl aluminum for the formation of an $Al_2O_3$ layer.

11. Method as claimed in claim 8, characterized in that nitrogen ($N_2$) is utilized as the purge gas (65).

12. Method as claimed in claim 8, characterized in that the temperature of the substrate holder (62) is set to a value in the range of 100° to 500° C., and that this temperature is kept constant, preferably with a temperature regulation means (55).

13. Method as claimed in claim 8, characterized in that the deposition of the protective layer (13) within the measuring vacuum chamber (9) and the transition of the opening of the second housing plate (4) to the connection means (5) covering the joining means (3, 6) is carried out such, that at least in this region a protective layer thickness of 20 to 200 nm is attained.

14. Method as claimed in claim 8, characterized in that with the contamination of the diaphragm measuring cell (8) through chlorine-containing process gases, a service life extension of the diaphragm measuring cell (8) is attained, which is greater than without the protective coating (13) by at least the factor 3.

15. Method as claimed in claim 8, characterized in that the first and the further precursor (58, 57) as well as the purge gas (65) are sequentially introduced into the vacuum chamber (64) with valves (56, 59, 61) operated under control and pulsed according to predetermined intervals and that the purge gas (60) is introduced via a gas flow regulator (60).

16. Method as claimed in claim 8, characterized in that as the diaphragm measuring cell (8) a capacitive diaphragm measuring cell (8) or an optically readable diaphragm measuring cell (8), is utilized.

17. Diaphragm vacuum measuring cell with a diaphragm (2) as pressure transducer, wherein on the one side of the diaphragm (2) at a spacing a first housing plate (1) is disposed sealing in the margin region with a joining means (3), such that between them a reference vacuum chamber (7) is formed and that on the other side of the diaphragm (2) at a spacing a second housing plate (4) is disposed sealing in the margin region with a joining means (3), such that between them a measuring vacuum chamber (9) is formed, and that the second housing plate (4) includes an opening and connection means (5) communicating with such and the measuring vacuum chamber (9) disposed sealing with joining means (3) for the connection of the measuring vacuum chamber (9) with the medium to be measured, wherein the diaphragm (2) and the two housing plates (1, 4) are comprised of ceramic, characterized in that the diaphragm is coated with an ALD method, such that the inner wall of the measuring vacuum chamber (9) and the opening with the connection means (5) is covered with a protective layer (13) such that the joining means (3, 6) are protectively covered the protective layer (13) being comprised of $TiO_2$ or $Ta_2O_5$.

18. Measuring cell as claimed in claim 17, characterized in that the housing plates are made of metal oxide that is one of the aluminum oxides, or contains at least partially the sapphire form.

19. Measuring cell as claimed in claim 17, characterized in that at least one of the joining means (3, 6), is comprised of a glass solder or a friction welding.

20. Measuring cell as claimed in claim 17, characterized in that the connection means (5) is formed of a metal or of a ceramic tubularly or as a connecting piece with a feed line, and is connected with the second housing plate with a joining means (6) through a glass solder or friction welding, wherein the inner wall of the feed line of the connection means is also protectively covered.

21. Measuring cell as claimed in claim 17, characterized in that the protective layer (13) within the measuring vacuum chamber (9) and the transition of the opening of the second housing plate (4) to the connection means (5) covers the joining means (3, 6) and takes place such, that at least in this region a protective layer thickness of 20 to 200 nm is provided.

22. Measuring cell as claimed in claim 17, characterized in that with the contamination of the diaphragm measuring cell (8) by chlorine-containing process gases, a service life extension of the diaphragm measuring cell (8) is provided, which is greater by the factor 3 than without the protective coating (13).

23. Measuring cell as claimed in claim 17, characterized in that the diaphragm measuring cell (8) is a capacitive diaphragm measuring cell (8) or an optically readable diaphragm measuring cell (8).

\* \* \* \* \*